United States Patent

[11] 3,597,535

[72] Inventor Theodore Bruger
Box 336, Sudbury, Ontario, Canada
[21] Appl. No. 777,074
[22] Filed Nov. 19, 1968
[45] Patented Aug. 3, 1971

[54] TELEVISION APPARATUS FOR RECORDING AND TRANSMITTING READING FROM WEATHER INSTRUMENTS

6 Claims, 7 Drawing Figs.

[52] U.S. Cl. 178/7.1
[51] Int. Cl. H04n 5/24
[50] Field of Search 178/DIG. 1, 6.8, 6, 5.4 ES, 7.2 D, 7.9, 7.88, 7.1

[56] References Cited

UNITED STATES PATENTS

| | | | |
|---|---|---|---|
| 1,660,886 | 2/1928 | Randall | 178/DIG. 1 |
| 3,226,476 | 12/1965 | Tyler | 178/DIG. 1 |
| 3,239,601 | 3/1966 | Keys | 178/6 |
| 3,488,439 | 1/1970 | Laird et al. | 178/6 |

*Primary Examiner*—Richard Murray
*Assistant Examiner*—Alfred H. Eddleman
*Attorney*—Kemon, Palmer & Estabrook

ABSTRACT: An apparatus for recording and transmitting readings from various weather-indicating instruments which can be received on a specific channel of a home television set in a particular community. The television camera which is stationary and is centrally positioned with respect to the various weather-indicating instruments utilizes a reflector for obtaining or picking up the image from the instruments.

Theodore Bruger
INVENTOR

Kemon, Riemer + Estabrook
ATTORNEYS

Theodore Bruger
INVENTOR

Kemon, Palmer & Estabrook
ATTORNEYS

Theodore Bruger
INVENTOR

Kemon, Lemer & Estabrook
ATTORNEYS

INVENTOR
Theodore Bruger

Kemon, Palmer + Estabrook
ATTORNEYS

Theodore Burger
INVENTOR

Kemon, Palmer + Estabrook
ATTORNEYS

TELEVISION APPARATUS FOR RECORDING AND TRANSMITTING READING FROM WEATHER INSTRUMENTS

BACKGROUND OF THE INVENTION

At present it is known to provide a scanning apparatus formed with a cylindrical scanner having an axis of rotation, the cylindrical scanner being formed with a plurality of angularly spaced optical systems and mirrors for each lens of the optical systems and carried for rotation about the scanning axis with the rotation of the scanner.

Also it is known to provide an orienting system for a pulse echo system in which a plurality of solenoid members are spaced approximately 120° from one another and have connected thereto a member which is pivoted to a single bearing support. In this structure, the solenoid members are not employed to effect a rotation of the bearing supported member but are connected to the bearing supported member to cause a pivotal movement of it when the solenoid members are energized.

SUMMARY OF THE INVENTION

The present invention is directed to a television apparatus for recording and transmitting weather readings from weather-indicating instruments which consists essentially of a television camera which televises readings on weather instruments which may include a rain gauge, thermometer, barometer, humidity and wind indicator, as well as slides and the like. This information is piped by a central station by way of a co-ax cable or other central distribution media to individual homes in the community on a specific channel on a television set. A reflector is switched to focus on each of the instruments in a prearranged sequence. The reflector is pivoted on a single ball bearing and is rotated by electromagnets to six or eight positions. The electromagnets are activated by a timer and microswitches so that the reflector is advance to the succeeding position in sequence to stop and dwell for a predetermined period. The timer consists of six or eight microswitches mounted stationary in octal or hexial shape around the timer cam which is driven by a small motor. The on and off time can be adjusted to any desired period. The television is located at the center of the instrumentation and is stationary and focuses on the reflector which picks up the image from the various instruments. The telecast of the various data is then transmitted and picked up by the individual television owners when they switch to the particular channel reserved for this purpose.

One model of the television apparatus for recording and transmitting weather readings from weather indicating instruments has an automatic 5 second dwell time with the switching time less than one tenth of a second, with continuous recycling as follows: time with a clock with a second sweep hand and a 360° dial, temperature from −50° to 100° F. with a 240° dial, wind direction indicating on a 240° dial, barometric pressure indicating 29.00 to 31.00 inches on a 300° dial, and a message space for interchangeable cards in a 4-inch-diameter area for community service such as advertising and news items. One of the objects is to provide a television apparatus for recording and transmitting weather readings from weather-indicating instruments in which the camera is located at the center of the weather-indicating instruments and is stationary and in which the quality of the image of the picture is improved considerably since there is no blur or fogginess due to movement of the camera.

Also it is the object to provide a television apparatus for recording and transmitting weather readings from weather-indicating instruments which will prove its superior engineering construction by use of solid-state circuitry and only one moving part.

Also it is the object to provide a television apparatus for recording and transmitting weather readings from weather-indicating instruments which has no heat problem in that only one heat-producing light is used for illumination and transistorized electronics.

Also it is the object to provide a television apparatus for recording and transmitting weather readings from weather-indicating instruments that is compact and versatile and of such small dimensions that it can be mounted in practically any place, and can be merely placed on a table, a shelf or on a standard instrument rack and takes up only about 15¾ inches of panel space, and accepts up to as many as five weather functions, time, projector and live pickup.

Also it is the object to provide a television apparatus for recording and transmitting weather readings from weather-indicating instruments that has low initial cost and maintenance cost which is due to its extreme simplicity.

DESCRIPTION OF THE PREFERRED EMBODIMENTS

Figure 1:
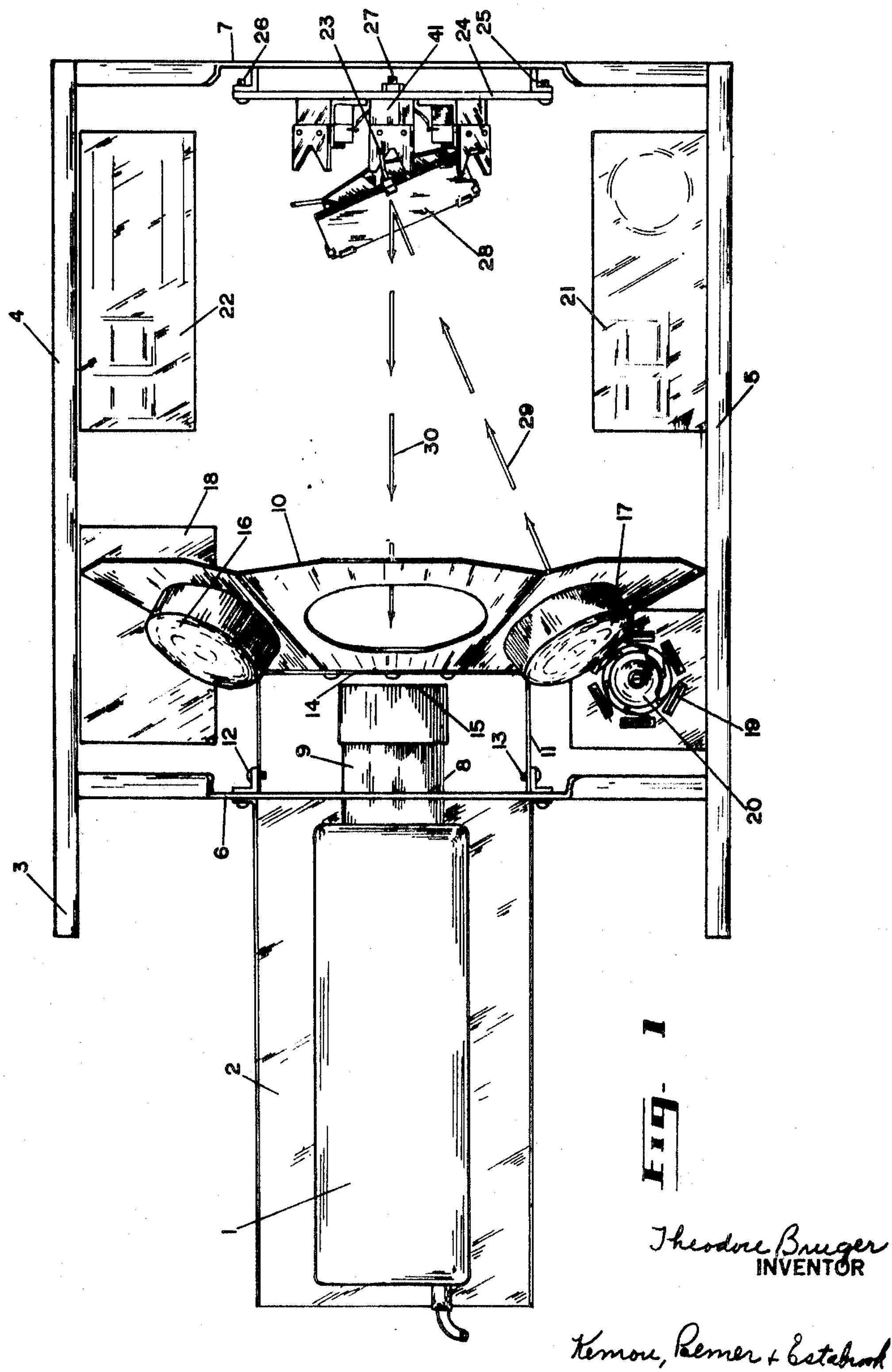
FIG. 1 is a plan view of the weather-indicating instrument.

Referring to the drawings, particularly to FIG. 1, the television apparatus for recording and transmitting readings on weather-indicating instruments consists of a television camera 1 which is stationary, a camera tray 2 and a cabinet frame 3. The cabinet frame 3 is formed with sides 4 and 5, a front end 6 and a rear end 7. The front end 6 is provided with an opening 8 through which the television lens 9 of the camera 1 extends. An angularly shaped instrument panel 10 is mounted on a bracket 11 and the bracket 11 is fastened to the front end 6 of the cabinet 3 by the bolts 12 and 13 or the like. A central aperture 14 is provided directly opposite and adjacent to the camera lens 9. Angularly mounted weather-indicating instruments 16 and 17 are shown mounted in the instrument panel 10 circularly of the aperture 14.

A fluorescent light ballast 18 is shown mounted in the cabinet 3. A timer 19 is provided with microswitches which are operated by a cam 20 which is driven by a small motor mounted in the cabinet 3. The power supplies 21 and 22 for operating the various parts of the invention are shown in the cabinet 3.

A reflector actuator assembly 23 is shown in FIG. 1 mounted inside the rear end 7 of the cabinet 3. The reflector actuator assembly 23 is mounted on a baseplate 24 of predetermined shape. The baseplate 24 is fastened to the rear end 7 of the cabinet 3 by bolts 25 and 26 or the like and a support bolt 27. A reflector 28 is pivotally mounted in the reflector actuator assembly 23 to receive the images in predetermined sequence along the dotted lines 29 as shown in FIG. 1 from the weather indicating instruments 16 and 17 from which the images are then picked up by the television camera 1 along the dotted line 30 for transmission to individual television owners.

Referring to FIGS. 3, 4, 5, 6 and 7, the reflector actuator assembly referred to in FIG. 1 as 23 is described in more detail. A ball bearing member 31 is fastened by nuts 32 and 33 to the baseplate 24. The forward end 34 is ball shaped and mounted in a central aperture 35 of an actuator plate 36. Brass bearing plates 37 surround and enclose the forward end 34 of the member 31. Screws 38 are shown for fastening the bearing plates 37 to the actuator plate 36. A reflector-mounting bracket 39 is fastened to the forward side of the bearing plates 37 and a reflector 28 is mounted in the mounting bracket 39. Actuator plate guides 40 are fastened to actuator-mounting brackets 41 by screws 42. The actuator-mounting brackets 41 are mounted on the baseplates 24 by bolts 43 as clearly shown in FIG. 4 and 6.

Figure 3:
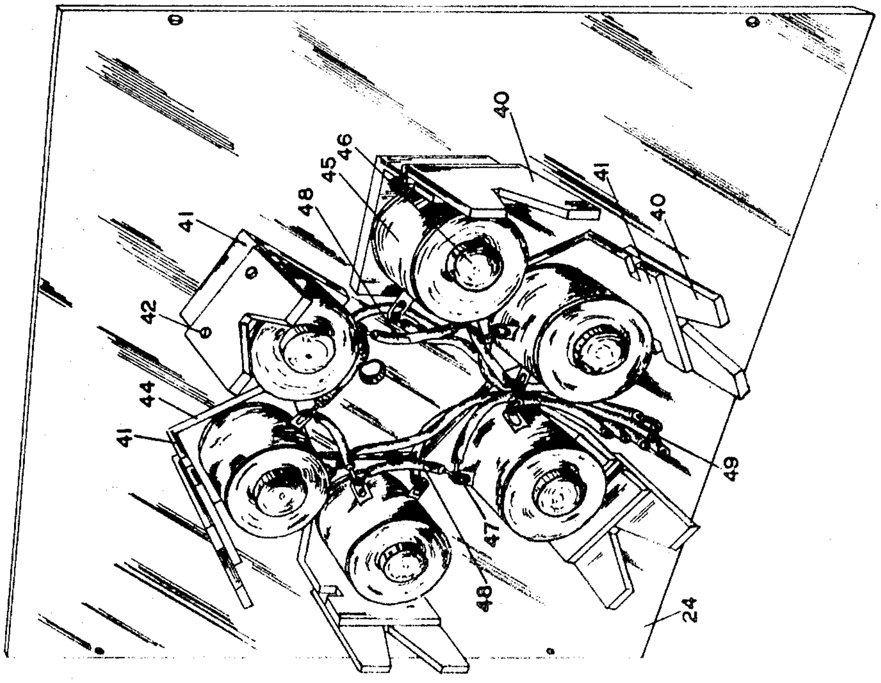
FIG. 3 is a perspective view partly in cross section of the disassembled reflector actuator assembly.
Figure 3:
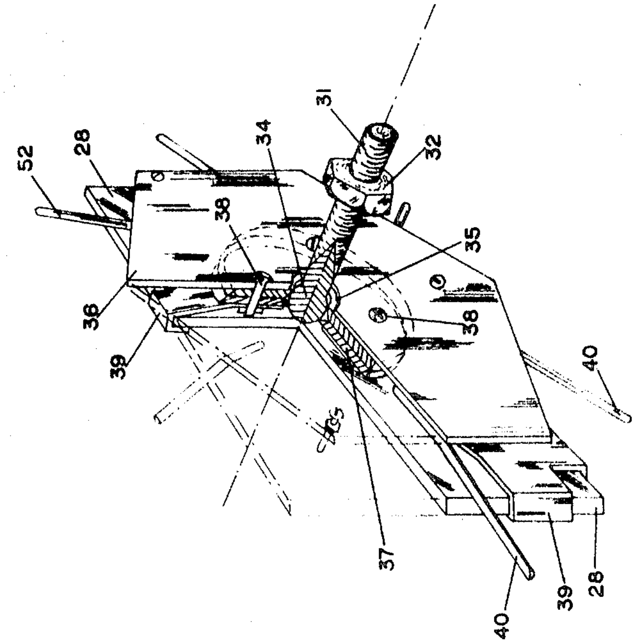
Figure 4:
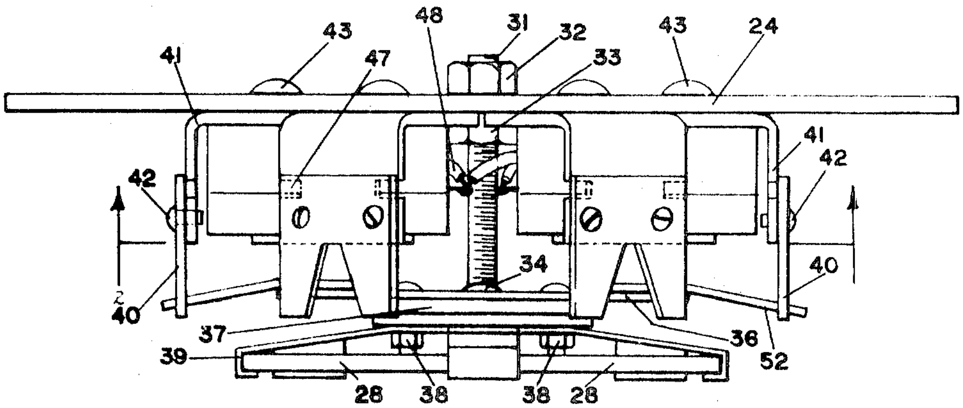
FIG. 4 is a plan view of the reflector actuator assembly.
Figure 5:
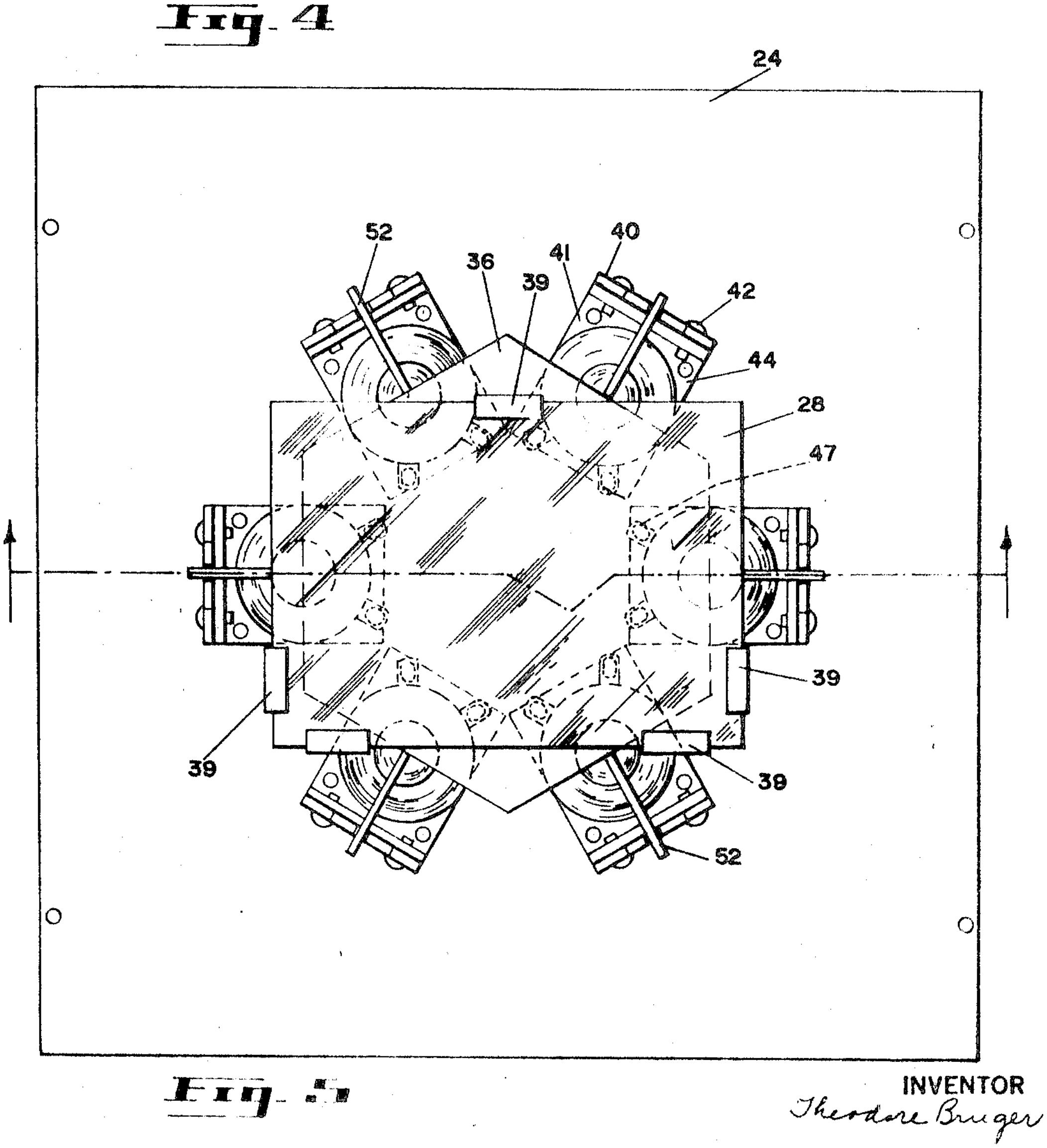
FIG. 5 is a view in elevation of the reflector actuator assembly.
Figure 6:
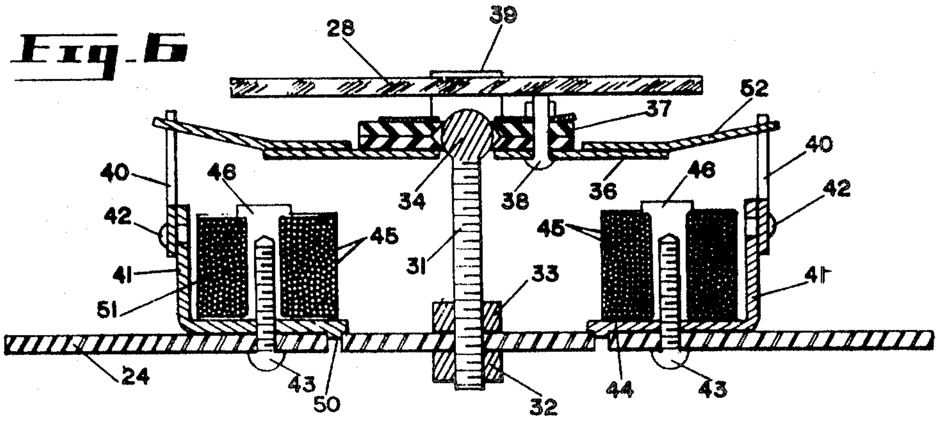
FIG. 6 is a cross-sectional view on the line C–D of FIG. 5 without the reflector.
Figure 7:
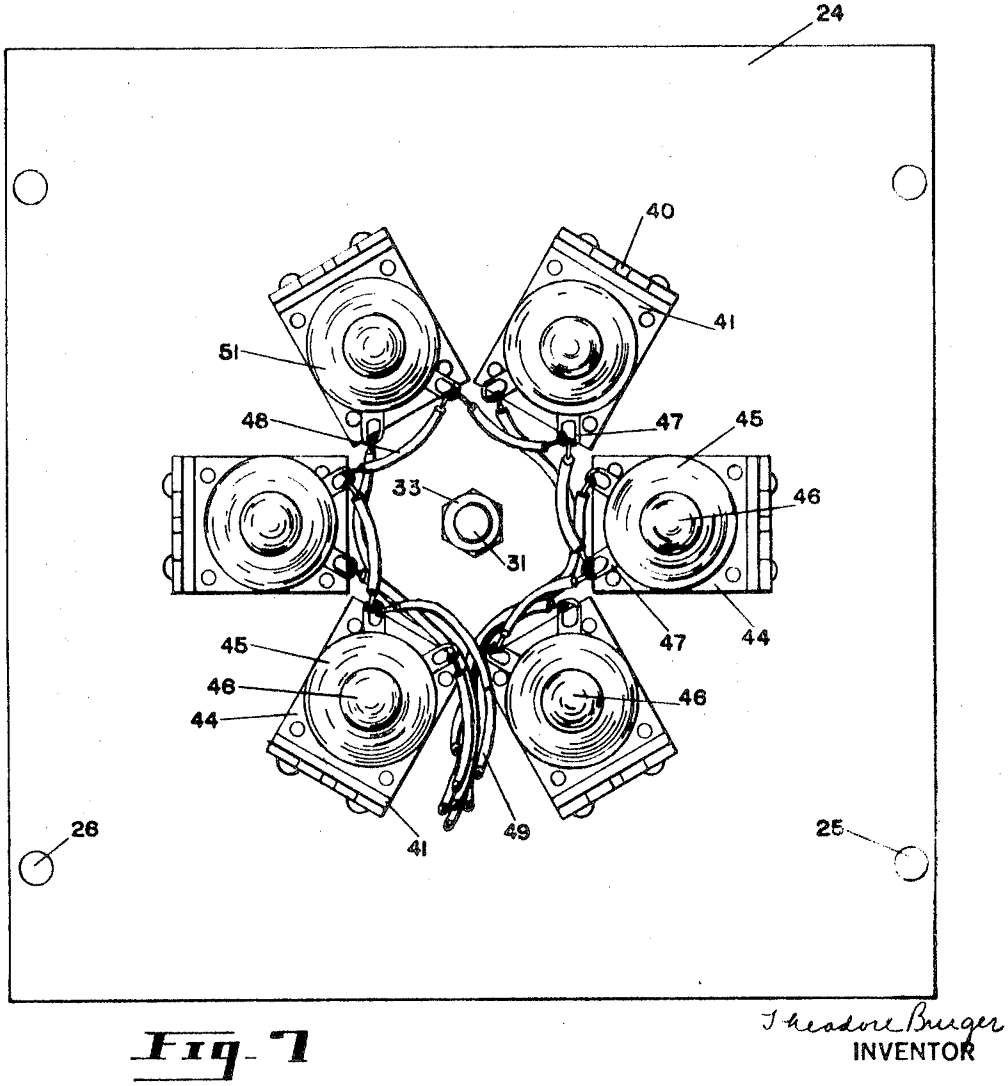
FIG. 7 is a cross-sectional view on the line A–B of FIG. 4.

Referring to FIGS. 6 and 7, the actuator-mounting brackets 41 are right angular in shape with the legs 44 fastened to the baseplate 24 by bolts 43. Magnetic coils 45 are mounted on the legs 44 of the actuator-mounting brackets 41 with the center of the magnetic coils 45 containing a magnetic core 46 of soft iron. As shown in FIG. 3, lugs 47 are mounted on each of the magnetic coils 45 for the cables 48 connecting the magnetic coils 45 together and cables 49 for the required operation of the reflector 28. Keys 50 are formed on the inner ends of the legs 44 of the actuator-mounting brackets 41. The electromagnets 51 consisting of magnetic coils 45 and magnetic cores 46 effect a rotation of the single ball bearing member 31 and this sets the reflector 28 to predetermined positions with reference to the weather instruments 16 and 17. The movements of the actuator plate 36 to which the reflector 28 is connected as previously described by the bolts 38 and the reflector-mounting bracket 39 are governed by the actuator plate guides 40 contracting the arms 52 of the actuator plate 36.

Figure 2:
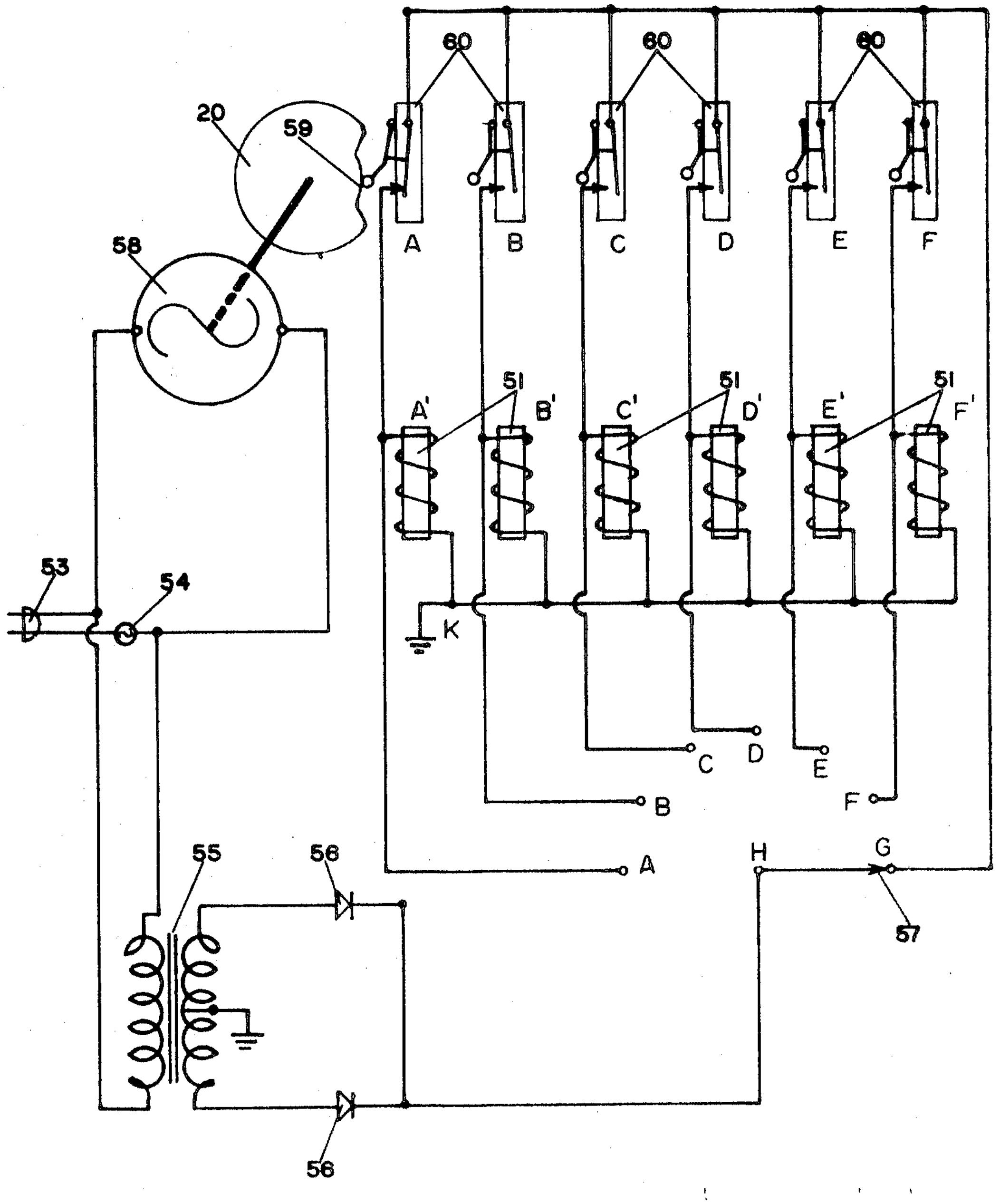
FIG. 2 is a schematic wiring diagram for operating the weather-indicating instrument.

As shown in FIG. 2, the wiring diagram is shown for operating the television apparatus for recording and transmitting the readings from the various weather instruments as described above consists of a line plug 53, a fuse 54, a transformer 55, diodes 56, a manual or automatically operated switch 57, and a synchronous motor 58. The motor 58 has six cams on its shaft, one cam for each microswitch 60 which are indicated as A, B, C, D, E, and F. Each cam is adjusted to allow its respective microswitch to make contact over one-sixth of the cam rotation, which is shown as the indented portion 59. Each cam is positioned so that the indented portion of the cams are sequenced over the entire revolution of the shaft. In the starting position microswitch A makes contact.

The operation of the invention is fairly clear from the above detailed description. When the manual switch is in the automatic position as shown in FIG. 2, current from the power supply 55 and 56 flows through a conductor to contact *h*, through contact *g* to the common conductor and contact of all the microswitches 60, through switch A, through coil A′ to contact *k*, to set up a magnetic field to pull and hold the actuator plate and mirror in this position. When the shaft is in motion it rotates the cams so that the switch A breaks contact and so disables the magnetic field in coil A′, and switch B makes contact and the current is directed through coil B′ to contact *k*, to set up a magnetic field to pull and hold the actuator plate and mirror in this new position. As the shaft continues in rotation switch B breaks contact, to disable the magnetic field in coil B′, and switch C makes contact and the current is directed to coil C′ to contact K to set up a magnetic field to pull and hold the actuator plate and mirror in this new position. As the shaft continues in rotation switch C breaks contact to disable the magnetic field in coil C′, and switch D makes contact to direct the current through coil D′ to contact *K* to set up a magnetic field to pull and hold the actuator plate and mirror in this new position. As the shaft continues in rotation switch D breaks contact to disable the magnetic field in coil D′, switch E makes contact to direct the current through coil E′ to contact *k* to set up a magnetic field to pull and hold the actuator plate and mirror to this new position. As the shaft continues in rotation switch E breaks contact to disable the magnetic in coil E′, switch F makes contact and the current is directed through coil F′ to contact *k* to set up a magnetic field to pull and hold the actuator plate and mirror in this new position. As the shaft continues in rotation switch F breaks contact to disable the magnetic field in coil F′, and switch A makes contact again to continue the operation. Thus a complete cycle has passed to position the mirror in six different directions. When power is applied to the motor the shaft continuously rotates and recycles as described above, which is called the automatic mode of operation. When the manual switch 57 is turned to contact *f* it disables the automatic mode of operation, and the current is directed through contact *f* through coil F′, to contact *k* to set up a magnetic field to pull the actuator plate and mirror in this position. The current continues to flow through coil F′ until switch is rotated to another position manually. This is true for each of the contacts *e*, *d*, *c*, *b* and *a*. This is called the manual mode of operation.

In the automatic mode of operation the time that the mirror remains in one position is contingent on the speed of the motor and shaft. The reflector transfers the images from the weather instruments in predetermined order to the television camera, which then transfers the images to a cable television circuit for individual homes on their television sets.

While the instant invention has been described and shown in what is conceived to be the most practical and preferred structure, it is recognized that departures may be made therefrom within the scope of the invention but it is to be accorded full scope of the claims. Although for purposes of clarity, the specification deals with an apparatus for recording and transmitting the readings from various weather-indicating instruments into the home, it must be understood that the real embodiment of the invention is the pivotally mounted reflector 28 rotated by electromagnetic means as within described.

I claim:

1. A television apparatus for recording and transmitting readings from various weather-indicating instruments comprising a television camera having a lens, a cabinet containing an instrument panel, the lens of said camera projecting through an aperture in said instrument panel, weather-indicating instruments mounted around said aperture in said instrument panel through which said lens of said camera projects, a reflector positioned in said cabinet, an actuator assembly for said reflector including an actuator plate and a baseplate, a bearing member mounted on said baseplate, said actuator plate supported on said bearing member in spaced parallel relation to said baseplate, means connecting said reflector to said actuator plate, electromagnetic means on said baseplate for rotating said actuator plate and reflector in predetermined periods of time to pick up images from said weather-indicating instruments.

2. A television apparatus for recording and transmitting readings from various weather-indicating instruments as defined in claim 1, in which said bearing member terminates in a ball shaped end portion.

3. A television apparatus for recording and transmitting readings from various weather-indicating instruments as defined in claim 2, in which said actuator assembly includes an actuator plate with bearing plates thereon for encompassing the ball shaped end portion of said bearing member with brackets on said bearing plates for engaging and supporting said reflector.

4. A television apparatus for recording and transmitting readings from various weather-indicating instruments as defined in claim 1 in which the electromagnetic means for rotating said reflector consists of a motor for operating a cam, a plurality of microswitches operated by the said cam, and a plurality of electromagnets operated by said microswitches.

5. A television apparatus for recording and transmitting readings from various weather-indiating instruments as defined in claim 3 in which the said electromagnetic means controls the movement of said actuator plate for the said reflector, the said actuator plate and said reflector being pivotally mounted and interconnected, the brackets for supporting the said electromagnets on said baseplate.

6. A television apparatus for recording and transmitting readings from various weather-indicating instruments as defined in claim 5 in which actuator plate guides are connected to said brackets supporting said electromagnets for controlling the movement of said actuator plate.